(12) United States Patent
Mondragon-Parra

(10) Patent No.: US 6,692,364 B2
(45) Date of Patent: Feb. 17, 2004

(54) CONSTANT VELOCITY JOINT

(75) Inventor: Eduardo Mondragon-Parra, Chih (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/015,874

(22) Filed: Dec. 13, 2001

(65) Prior Publication Data

US 2003/0114230 A1 Jun. 19, 2003

(51) Int. Cl.[7] .............................................. F16D 3/227
(52) U.S. Cl. ........................................ 464/144; 464/146
(58) Field of Search ................................ 464/144, 145, 464/146, 167, 906; 384/49, 51, 523, 534; 29/898.067

(56) References Cited

U.S. PATENT DOCUMENTS

| | | | | |
|---|---|---|---|---|
| 2,046,584 A | * | 7/1936 | Rzeppa | 464/146 X |
| 5,222,914 A | * | 6/1993 | Mazziotti | 464/144 |
| 5,292,285 A | * | 3/1994 | Ingalsbe et al. | 464/144 |
| 5,944,612 A | * | 8/1999 | Schwarzler | 464/144 |

FOREIGN PATENT DOCUMENTS

| | | | | |
|---|---|---|---|---|
| DE | 649 299 | * | 8/1937 | 384/523 |
| GB | 1 500 768 | * | 2/1978 | 464/146 |
| SU | 706595 | * | 12/1979 | 384/523 |

OTHER PUBLICATIONS

Universal Joint and Driveshaft Design Manual, AE–7, The Society of Automotive Engineers, Inc. pp. 163–166, TJ1079.S62 1979.*

* cited by examiner

Primary Examiner—Greg Binda
(74) Attorney, Agent, or Firm—Michael D. Smith

(57) ABSTRACT

A constant velocity joint has an outer race, inner race, and balls interposed therebetween. The balls are seated in apertures of a cage. The inner wall profile of the cage has a cross section contour through the longitudinal axis that is radial about a radius that has its center origins offset from the center point of the cage along the ball center plane. The outer wall profile also has a cross sectional contour that is radial about a radius with its center also offset from the center point along the ball center plane of the cage and from the radial center of the inner wall radius.

1 Claim, 3 Drawing Sheets

CONSTANT VELOCITY JOINT

BACKGROUND OF THE INVENTION

1. Technical Field

This invention relates to constant velocity joints.

2. Related Art

Constant velocity joints have long been known to eliminate the problems of sinusoidal variation of speed between the input driving shaft and the driven shaft when an angle exists between the two shafts. This quality is extremely desirable in front half shafts for front wheel drive motor vehicles where a relatively high angle may exist between the drive half shaft and the driven shaft. Because the driven shaft is connected to suspended steerable wheels, the angle may also vary.

Cross groove style constant velocity joints as well as other types of CV joints use balls interposed between an inner race and outer race to pass torque from one race to the other race. The cage has windows sized to retain the balls. Aucktor style cages with concentric spherical inner diameters and outer diameters have been commonplace. These types of cages have an opening with a diameter that is less that the outer diameter of the inner race. The advantage of this relative geometry of the inner race and cage is that the inner race, once assembled within the cage, is then retained within the cage to entrap the balls and prevent them from falling out. However, the spherical inner and outer diameters also restrict the stroke angle capabilities of the constant velocity joint.

In addition, the cage wall thickness is relatively constant with the inner and outer concentric diameters defining the relatively constant thickness. The cage needs to have strength to retain the balls in position during the operation of the constant velocity joint and as torque transfers through the balls.

SUMMARY OF THE INVENTION

In accordance with one aspect of the invention, a constant velocity joint has an inner race, an outer race, and a plurality of torque-transmitting balls disposed in a cage that is interposed between the inner race and outer race. The cage has an outer wall and an inner wall that are non-concentric in cross-section along the central longitudinal axis of the cage. The cage has a variable wall thickness that is greatest in proximity to a ball center plane and tapers toward distal ends of the cage.

Preferably, the outer wall has a cross-sectional radial contour with a radius centered on a line extending through the center point of the cage. The inner wall has a cross-sectional radial contour with a radius centered on a line extending through the center point of the cage. The radius of the inner wall is greater than the radius of the outer wall and has its radial center point linearly offset from the radial center point of the outer wall radius, with both the inner wall radius and outer wall radius being greater than one half of the outer diameter of the cage.

BRIEF DESCRIPTION OF THE DRAWINGS

Reference now is made to the accompanying drawings in which.

DETAILED DESCRIPTION

Figure 1:
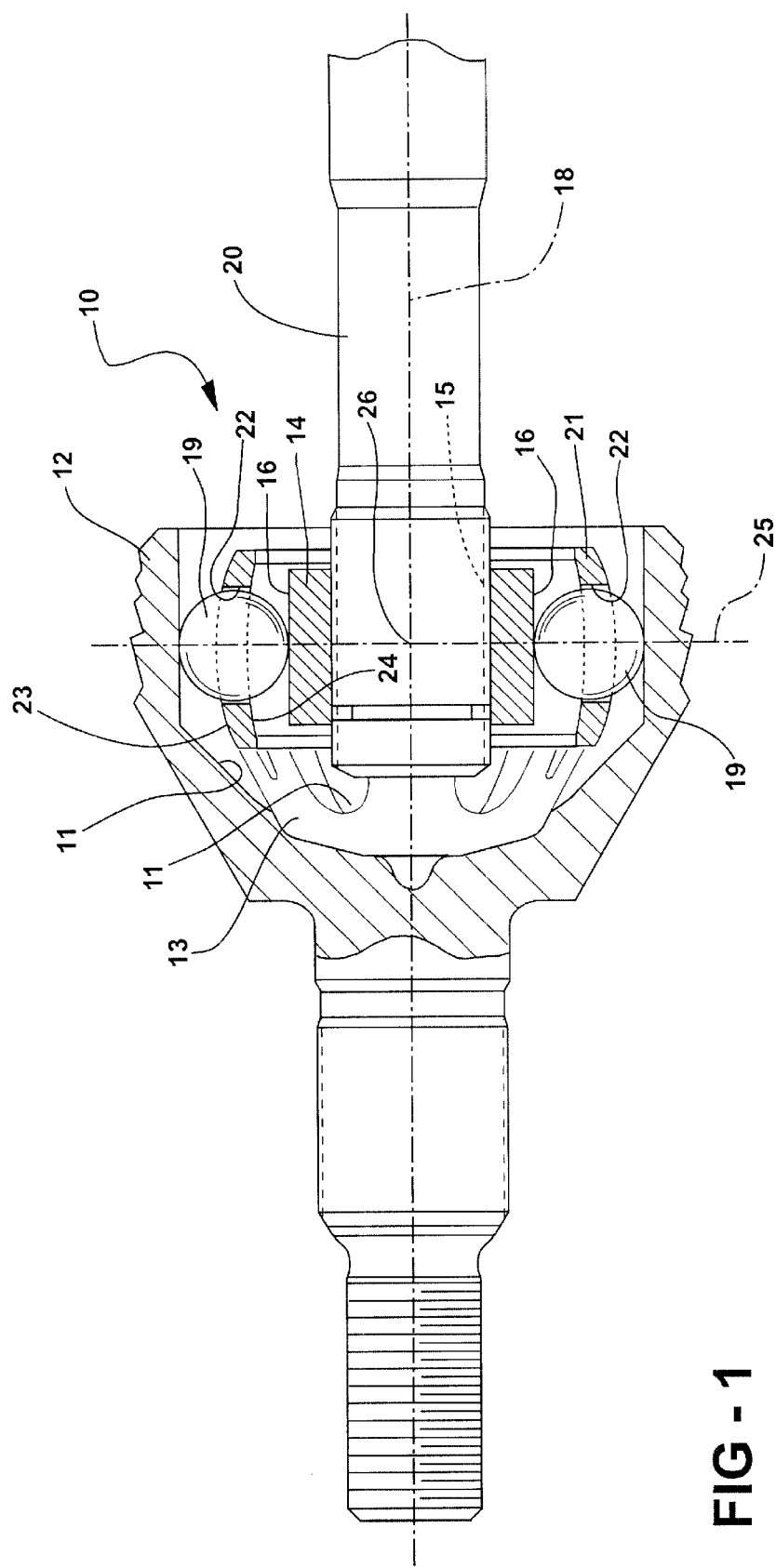
FIG. 1 is a cross sectional view of a constant velocity joint incorporating a cage in accordance with an embodiment of the invention.

Referring now to FIG. 1, a cross groove style constant velocity joint 10 is shown with an outer race 12. It has six alternately crossed ball tracks 11 on its inner face 13. An inner race 14 having a central splined open 15 which allows connection with a shaft 20, and six alternately crossed ball tracks 16 on its outer face. Connection between the inner and outer race is by means of six balls 19 that are held between the ball tracks. The balls 19 are kept in the constant velocity plane by means of a cage 21, having six windows 22 in which the six balls are disposed.

Figure 2:
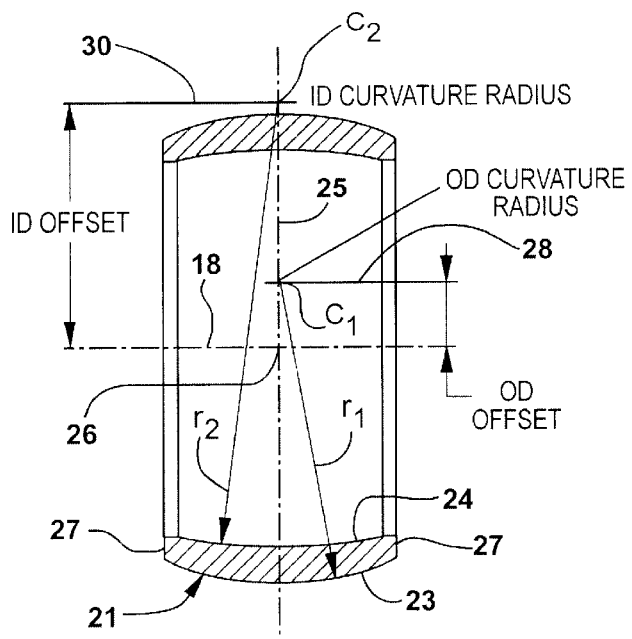
FIG. 2 is a cross sectional view of the cage shown in FIG. 1.
Figure 3:
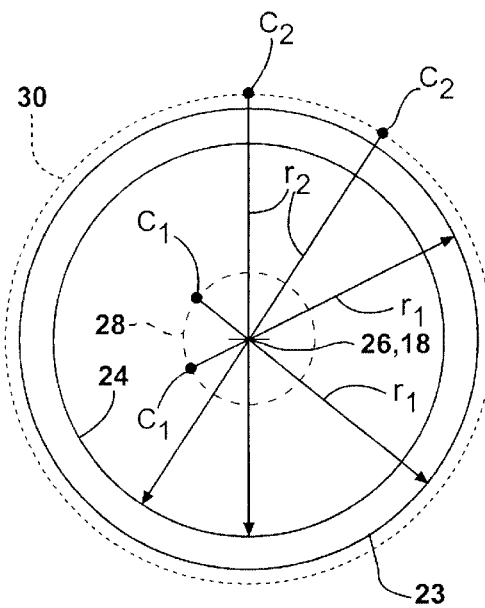
FIG. 3 is a cross sectional view on the center plane of the cage shown in FIG. 2.

The cage 21, as more particularly shown in FIGS. 2 and 3 has an outer wall profile 23 formed with a radial contour in the longitudinal direction of axis 18. The radii $r_1$ has its center $c_1$ offset from the centerpoint 26 of the cage 21 along the ball center plane 25, that is also the constant velocity plane.

The inner wall profile 24 also has a radial contour in longitudinal cross section with a radius $r_2$ with a center $c_2$ that is offset from centerpoint 26 along the ball center plane 25.

Inner wall and outer wall profiles when revolved around the longitudinal axis 18 form the surfaces that constitute the cage.

Figure 4:
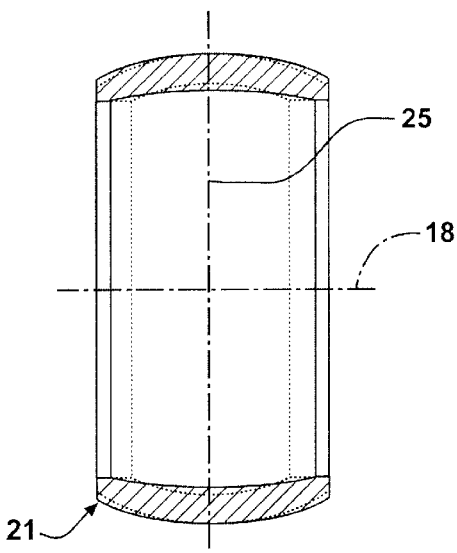
FIG. 4 is a segmented view similar to FIG. 2 showing the invention in comparison with a conventional Aucktor Style cage shown in phantom.

The cage inner wall profile 24 and outer wall profile 23 surfaces are concentric in the ball center plane 25 of the cage as shown in FIG. 3, the inner wall profile 24 and outerwall profile 23 are not concentric as cross sectioned along the longitudinal axis 18 as shown in FIG. 2. As shown in FIGS. 2 and 4, the cage 21 has a wall thickness that varies from its centerplane 25 with its thickest portion in proximity to plane 25 and being tapered toward the distal ends 27. As shown in FIG. 3, the Center $c_2$, of the inner wall profile 24 is disposed on a circle 30 about the longitudinal axis 18 and the center $c_1$ of the outer wall profile 23 is disposed on a smaller circle 28, the inner profile 24 circle 30, being larger than the outer profile 23 circle 28. The curvature radius $r_2$ of the inner wall profile 24 is greater than the curvature radius $r_1$ of the outer wall profile 23. Both wall profiles 23 and 24 have circular contours in cross-section axially along the longitudinal axis 18 as shown in FIGS. 1, 2 and 4–7. The radius center $c_2$ of the inner wall profile 24 is offset ("GD OFFSET" in FIG. 2) along the center plane 25 from the radius center $C_1$ of the outer wall profile 23 with both of the wall profile curvature radiuses $r_1$ and $r_2$ being greater in length than one half the outer diameter of the cage 21, i.e., the maximum distance from the outer wall 23 to the longitudinal axis 18. Said another way, the radiuses $r_2$ and $r_1$ of the inner 24 and outer 23 wall profiles are both greater than the distance between the longitudinal axis 18 and the outer wall profile 23 in the central plane 25.

FIG. 4 shows the invention in full lines on a prior art Aucktor type cage shown in phantom.

Figure 5:
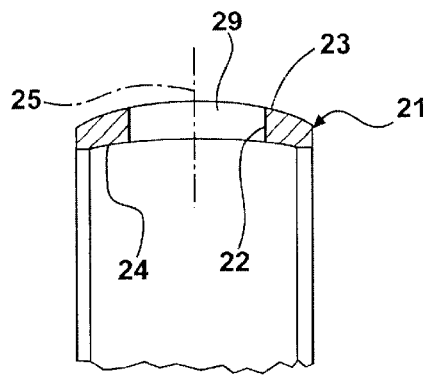
FIG. 5 is an enlarged segmented view of an alternate cage configuration.

The variable thickness between the inner diameter and outer diameter may also be achieved by alternate contours produced by other equations. For example, as illustrated in FIG. 5, one of the walls may be contoured as a function that contains trigonometric or logarithmic terms. Alternately, the walls may be contoured in accordance with a third or higher grade polynomial equation. Another alternative may be that the walls may be contoured in accordance with a quadratic equation that represents an ellipse or parabola. The eccentricity of the ellipse must be different from the eccentricity of a circumference. Furthermore, a flat surface may also be optionally placed in the inner wall to increase the thickness of the center portion of the cage and thus the thickness of webs near center plane 25.

Figure 6:
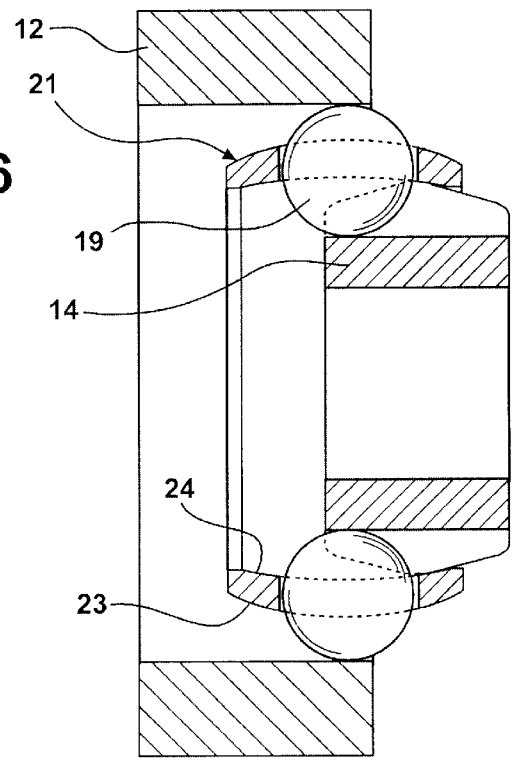
FIG. 6 is a schematic cross-sectional view of the constant velocity joint shown in FIG. 1 illustrating the stoke limit.
Figure 7:
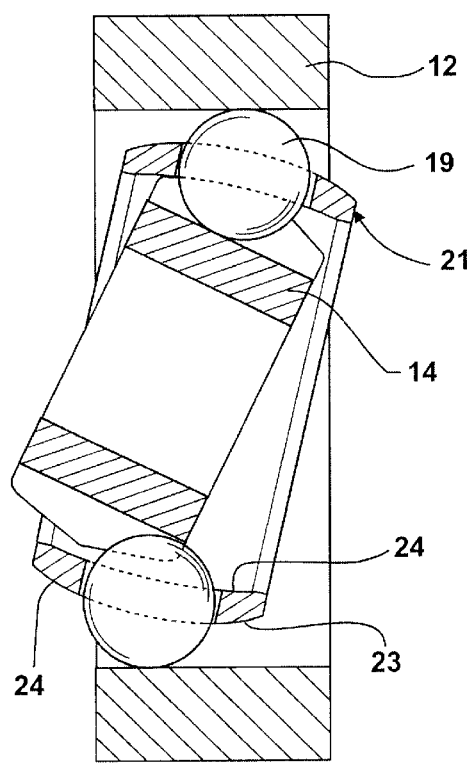
FIG. 7 is a view similar to FIG. 6 of the constant velocity joint 15 illustrating the angle limit.

As illustrated in FIG. 6, the shape of the cage captures the inner race 14 and provides for significant stroke limits of the constant velocity joint. As illustrated in FIG. 7, the angle of freedom is comparable to that of a constant velocity joint having a conventionally shaped cage of uniform thickness.

In this fashion, the increased thickness in the central plane section produces a cross section with greater area and, hence, enhanced strength that provides for a cage that can withstand greater loads.

Variations and modifications are possible without departing from the scope and spirit of the present invention as defined by the appended claims

What is claimed is:

1. A constant velocity joint, comprising:

an inner race;

an outer race;

a cage disposed between said inner race and said outer race and having a central longitudinal axis;

a plurality of torque-transmitting balls disposed between said inner race and said outer race about said longitudinal axis in a ball center plane and captured by said cage; and wherein said cage has an outer wall profile of a convex curvature in an axial direction of said cage, and an inner wall profile of a concave curvature in said axial direction, said outer and inner wall profiles being non-concentric in cross section to provide a variable wall thickness to said cage that is greater adjacent said ball center plane of said cage and tapers to a lesser thickness adjacent opposite axial ends of said cage, said outer and inner wall profiles having circular contours in cross section in the axial direction, said outer and inner wall profiles each having a circular contour radius with a center of each radius lying in said ball center plane, said contour radius of said inner wall profile being greater than said contour radius of said outer wall profile, said radius center of said inner wall profile being offset along said center plane from the radius center of said outer wall profile, and said inner wall radius and said outer wall radius each being greater in length than one half of the outer diameter of said cage.

* * * * *